US008779981B2

(12) United States Patent
Eisen et al.

(10) Patent No.: US 8,779,981 B2
(45) Date of Patent: Jul. 15, 2014

(54) 2D WEB TRILATERATION

(75) Inventors: Ori Eisen, Scottsdale, AZ (US); Steve Pandich, Scottsdale, AZ (US); Raz Yalov, Scottsdale, AZ (US)

(73) Assignee: The 41st Parameter, Inc., Scottsdale, AZ (US)

(*) Notice: Subject to any disclaimer, the term of this patent is extended or adjusted under 35 U.S.C. 154(b) by 0 days.

(21) Appl. No.: 12/714,412

(22) Filed: Feb. 26, 2010

(65) Prior Publication Data

US 2011/0210887 A1 Sep. 1, 2011

Related U.S. Application Data

(60) Provisional application No. 61/156,456, filed on Feb. 27, 2009.

(51) Int. Cl.
*G01S 5/14* (2006.01)
(52) U.S. Cl.
USPC ........................................................ 342/465
(58) Field of Classification Search
CPC ........... G01S 5/14; G01S 13/878; G01S 5/16; H04L 43/0852; H04L 43/0858; H04L 43/0864; H04L 41/12
USPC ........................................................ 342/465
See application file for complete search history.

(56) References Cited

U.S. PATENT DOCUMENTS

| 5,521,907 | A | 5/1996 | Ennis, Jr. |
| 6,804,624 | B2 | 10/2004 | Silverman |
| 6,937,569 | B1* | 8/2005 | Sarkar et al. ................. 370/238 |
| 6,947,978 | B2 | 9/2005 | Huffman |
| 7,296,088 | B1* | 11/2007 | Padmanabhan et al. ...... 709/238 |
| 7,436,780 | B2 | 10/2008 | Stephens |
| 7,711,846 | B2* | 5/2010 | Padmanabhan et al. ...... 709/238 |
| 7,739,402 | B2* | 6/2010 | Roese et al. .................. 709/242 |
| 2001/0016876 | A1 | 8/2001 | Kurth et al. |
| 2008/0005394 | A1 | 1/2008 | Crooks |
| 2008/0010367 | A1 | 1/2008 | Chen |
| 2008/0101277 | A1 | 5/2008 | Taylor |
| 2009/0177692 | A1* | 7/2009 | Chagoly et al. ............ 707/104.1 |
| 2009/0228585 | A1 | 9/2009 | Kosbab et al. |
| 2010/0153540 | A1* | 6/2010 | Li et al. ......................... 709/224 |

OTHER PUBLICATIONS

"Constraint-Based Geolocation of Internet Hosts" Gueye, Bamba et. al., IMC'04, Oct. 25-27, 2004, Taormina, Sicily, Italy.*

* cited by examiner

*Primary Examiner* — Cassie Galt
(74) *Attorney, Agent, or Firm* — Wilson Sonsini Goodrich & Rosati

(57) ABSTRACT

The invention provides systems and methods of locating a network device based on the time latency between a request by a user device and the receipt of the request by a plurality of satellite servers provided at different locations. Preferably three or more satellites may be employed. The request may be for an item, which may have a known file size, and which may or may not exist. Triangulation techniques may be utilized to determine the location of the device relative to the satellite servers.

19 Claims, 13 Drawing Sheets

| Location | Time latency |
|---|---|
| San Francisco, U.S.A.: | 6 |
| Santa Clara, U.S.A.: | 8.8 |
| Vancouver, Canada: | 29.3 |
| Austin, U.S.A.: | 48.8 |
| Chicago, U.S.A.: | 56.1 |
| New York, U.S.A.: | 85.4 |
| Florida, U.S.A.: | 97.3 |
| Nagano, Japan: | 112.1 |
| Auckland, New Zealand: | 138.6 |
| London, United Kingdom: | 144.4 |
| Paris, France: | 154.9 |
| Amsterdam, Netherlands: | 163.4 |
| Sydney, Australia: | 166.6 |
| Lille, France: | 167 |
| Cologne, Germany: | 169.1 |
| Copenhagen, Denmark: | 171.5 |
| Amsterdam2, Netherlands: | 171.8 |
| Amsterdam3, Netherlands: | 172.2 |
| Munchen, Germany: | 174.5 |
| Stockholm, Sweden: | 174.9 |
| Groningen, Netherlands: | 177.8 |
| Madrid, Spain: | 181.5 |
| Melbourne, Australia: | 182.7 |
| Zurich, Switzerland: | 183.6 |
| Hong Kong, China: | 193.4 |
| Rio de Janeiro, Brazil: | 195.3 |
| Krakow, Poland: | 204.6 |
| Antwerp, Belgium: | 207.9 |
| Singapore, Singapore: | 212.6 |
| Shanghai, China: | 216.5 |
| Haifa, Israel: | 224.6 |
| Cagliari, Italy: | 240.8 |
| Mumbai, India: | 281.7 |
| Johannesburg, South Africa: | 483.9 |

FIG. 5

| Start Time | End Time | Round Trip Time | One Way Trip Time | Current Link |
|---|---|---|---|---|
| 1235534057563 | 1235534057688 | 125 | 62.5 | http://203.63.130.197/uploads/assets/images/presenters/50/FB61898D-E19B-49E2-B16106EA8246316E.jpg |
| 1235534057688 | 1235534057829 | 141 | 70.5 | http://www.yeladudim.co.il/FB61898D-E19B-49E2-B16106EA8246316E.jpg |
| 1235534057829 | 1235534057876 | 47 | 23.5 | http://125.206.176.224/link_logo/FB61898D-E19B-49E2-B16106EA8246316E.jpg |
| 1235534057891 | 1235534057907 | 16 | 8 | http://212.58.253.68/commissioning/images/people/FB61898D-E19B-49E2-B16106EA8246316E.jpg |

Fig. 6

| Satellite Server Request | Time Delta (milliseconds) |
|---|---|
| http://LA.WebGPS.com/12345.gif | 1 |
| http://NY.WebGPS.com/12345.gif | 5 |
| http://UK.WebGPS.com/12345.gif | 10 |
| http://JP.WebGPS.com/12345.gif | 12 |
| http://HK.WebGPS.com/12345.gif | 13 |

FIG. 13

2D WEB TRILATERATION

CROSS-REFERENCE

This application claims the benefit of U.S. Provisional Application No. 61/156,456, filed Feb. 27, 2009, which application is incorporated herein by reference.

BACKGROUND OF THE INVENTION

Global positioning systems (GPS) have used 3D trilateration in the past to locate a target. Physical GPS systems have used a minimum of 4 satellites to ascertain longitude, latitude and attitude (3D trilateration). Such systems have been useful for determining the location of a target based on the intersection of various vectors.

Systems have tried to utilize real world trilateration methods to locate a network device. See, e.g., U.S. Patent Publication No. 2008/0010367, U.S. Patent Publication No. 2008/0101277, U.S. Pat. Nos. 7,436,870, 6,947,978, which are hereby incorporated by reference in their entirety. One previous system utilized commands such as network trace routes or pinging commands to ascertain network latency between a test device and a target device. See U.S. Pat. No. 6,804,624, which is hereby incorporated by reference in its entirety. Another previous system required the use of JavaScript code running on a target's browser to ascertain the latency. See U.S. Patent Publication No. 2008/0005394, which is hereby incorporated by reference in its entirety.

The problem with using such techniques as described by prior systems is that various network devices or servers may not be configured to respond to various commands (such as ping), or may not have a requisite application, such as JavaScript, installed in its browser. Thus, such intrusive methods of determining network latency may not work unless the various components of the system are configured to accept the various commands.

Thus, a need exists for a system or method of locating a network device using a non-intrusive technique that may be applied universally without requiring specific configurations or applications at different network components.

SUMMARY OF THE INVENTION

The invention provides systems and methods for 2D web trilateration. Various aspects of the invention described herein may be applied to any of the particular applications set forth below or for any other types of systems or methods for locating a network device. The invention may be applied as a standalone system or method, or as part of an integrated software package, such as a fraud detection or authentication software or application. It shall be understood that different aspects of the invention can be appreciated individually, collectively, or in combination with each other.

In accordance with one aspect of the invention, a system is provided, which may include a user device, a host server, a master server, and a plurality of satellite servers. Preferably, there may be three or more satellite servers. The user device may be configured to receive an item, such as a file or object. The user device may request to receive a file or object from the plurality of satellite servers. The satellite servers may be configured to receive the request. The user device request may be based on a globally unique identifier (GUID) provided by the master server. The master server may also poll the satellite servers on when they received the request from the user device. The satellite server clocks may all be synchronized. Based on this information, the concept for a 2D trilateration, and by using a minimum of three geo-points (provided by the satellite servers), may be used to locate the device position on a map (e.g., longitude and latitude). The master server may be configured to determine the geo-location of the user device based on relative locations of the satellite servers and relative times that the satellite servers received the request using a triangulation technique.

In accordance with another aspect of the invention, a method may be provided which may include a user desiring to access a host. The user may be trying to log onto a host server. The host server may request various GUIDs from a master server, and the GUIDs may be provided to the user device. A web browser of the user device may request one or more items from three or more satellite servers using the GUIDs. The master server may poll the satellite servers for the times they received the item request. Based on this request receipt time, and the known locations of the satellite servers, the master server may determine the user device's physical location. The master server may do this using a triangulation technique. Thus, 2D web trilateration can be used to attempt to geo-locate a device on a distributed network.

The systems and techniques provided by the invention may enable to establish an approximate location for an end node on a network, by simply calculating the intersection of at least three vectors (triangulation). The invention also provides a technique for determining the global position of the end node based on a generic request made to servers, which may be applied widely if not universally, without depending on system configurations or pre-installed applications. This capability may have a broad application, from risk management, marketing, compliance, authentication and even locating an approximate location of a stolen device.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 shows a table providing an example of various data points that may be collected.

FIG. 6 shows a table providing another example of various data points that may be collected.

FIG. 13 shows an example a table with requests made and time deltas between a device and servers.

DETAILED DESCRIPTION OF THE INVENTION

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Figure 1:
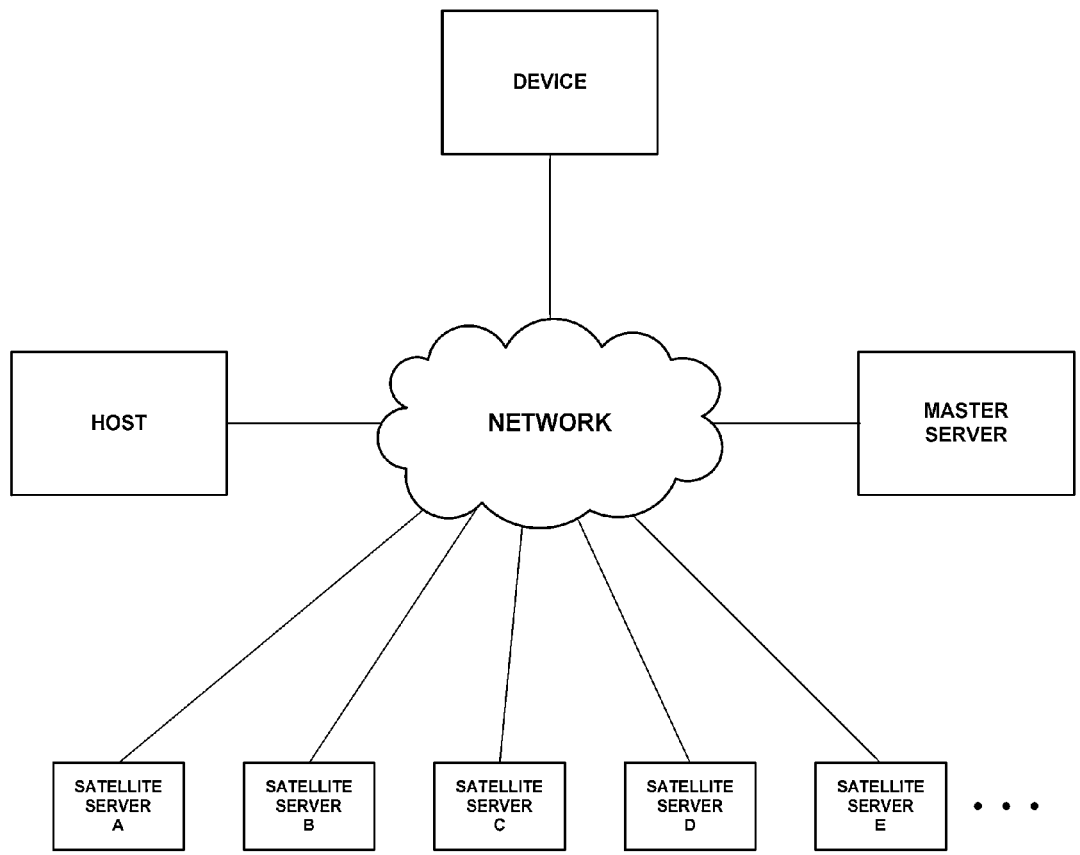
FIG. 1 shows a system for locating a networked device in accordance with an embodiment of the invention.

Referring to the drawings in detail, FIG. 1 shows a system for locating a networked device in accordance with an embodiment of the invention. Such a system may include a device, a host server, a master server, and a plurality of satellite servers (e.g., satellite server A, B, C, D, E, . . . ). Any or all of these components may communicate with one another over a network. In preferable embodiments, all of these components may be communicating over the same network (such as the Internet) while in other embodiments, a plurality of networks may be utilized. A network may be any interconnection between devices, servers, etc. For example, the network may be a wide area network, such as the Internet, or a local area network.

The device may be connected over the network. Any discussion of a device may also apply to any type of client computer, including but not limited to a personal computer, server computer, or laptop computer; or any other type of network device such as personal digital assistants (PDAs) such as a Palm-based device or Windows CE device; phones such as cellular phones; a wireless device such as a wireless email device or other device capable of communicating wirelessly with a computer network; a client side device which may be accessed by a user; server device; or any other type of network device that may communicate over a network and handle electronic transactions.

The host may be configured to communicate with one or more user devices, and may be any sort of online organization, such as an electronic commerce business, an online merchant, a financial institution, or any other type of website service provider that may provide a service to a user or may interact with a user device. A host and a user device may perform an electronic transaction, such as a purchase of a product or service, such as online banking. In some instances, each electronic transaction may be susceptible to fraud and each user device can be identified and/or located to reduce the risk of fraud.

The connection between a device and a host may be, for example, a connection between a client computer and a website server over a network. One or more servers may communicate with one or more client computers across a network. In some examples, a plurality of satellite servers may communicate with one or more client computer, or a master server may communicate with a plurality of satellite servers, or a master server may communicate with a host server over a network. The network, for example, can include a private network, such as a LAN, or interconnections to the online organizations over a communications network, such as the Internet or World Wide Web or any other network that is capable of communicating digital data, such as a wireless or cellular network. Each user device may connect to any online organization over the network using data protocols, such as HTTP, HTTPS and the like.

When a user device is communicating with a server, such as a host server, master server, or satellite servers, the device memory may store an operating system (OS) and a browser application. For example, the operating system may operate to display a graphical user interface to the user and permit the user to execute other computer programs, such as the browser application. The browser application, such as Microsoft Internet Explorer, when executed by the processor, permits the user to access the World Wide Web as is well known. The user device may interact with a host that may communicate with a master server, which may determine the location of the user device derived from information gathered from the satellite servers in accordance with the invention.

A user device may send or receive computer readable media, which may contain instructions, logic, data, or code that may be stored in persistent or temporary memory of the user device, or may somehow affect or initiate action by the user device. Similarly, one or more servers (such as a host server, master server, or satellite server) may communicate with one or more user device across a network, and may transmit or receive computer resources (which may be files, images, objects, or various requests such as GET/POST) residing in memory. Any computer readable media with logic, code, data, instructions, may be used to implement any software or steps or methodology.

A host may have one or more web-based server computers, such as a web server, an application server, a database server, etc., that are capable of communicating with a user device or server over a network, such as the Internet or a wireless network, and are capable of providing web pages to the user device. In some implementations, the host may comprise one or more processors, one or more persistent storage devices and a memory. For the host to interact with the user devices, the memory may store (and the processor(s) may execute) a server operating system and a transaction processing software system to facilitate an electronic transaction between the host and one or more user devices. Each host may further comprise a database, such as a database server or a data structure stored in the memory of the host, that stores the electronic transaction data for the host.

Similarly, a master server may have one or more web-based server computers, such as a web server, an application server, a database server, etc., that are capable of communicating with a user device or server over a network, and are capable of providing data to be used by browsers of the user device. In some implementations, the master server may comprise one or more processors, one or more persistent storage devices and a memory. For the master to interact with the user devices or other servers, the memory may store (and the processor(s) may execute) a server operating system and a transaction processing software system to facilitate an electronic transaction between the master server and one or more user devices or one or more servers. Each master server may further comprise a database, such as a database server or a data structure stored in the memory of the master server, that stores the electronic transaction data for the master server. The database may also include information such as globally unique identifiers (GUIDs) to be provided to a user device, or information about various satellite servers.

Satellite servers may have any of the components of other servers as discussed previously. Any number of satellite servers may be utilized by the system. For example, one, two, three, four, five, six, eight, ten, fifteen, twenty, or thirty satellite servers may be used. Preferably, three or more satellites may be used. In some instances, more satellite servers may be available in the system than are actually utilized in an iteration of a device location method, which may be discussed in greater detail below. Thus, in some embodiments, a system of satellite servers (e.g., 50 satellite servers) but only a subset of them (e.g., 7 satellite servers) may receive a request during a given attempt at a location of a device.

Preferably, the satellite servers are located far apart from one another. For example, during an initial iteration of a device location method, satellites may be utilized that are spread across the world. Examples of this may be discussed in greater detail below. In some instances, the satellite servers may be somewhat closer to one another when an estimate for the location of a user device is provided. For example, if the location of the user device has been narrowed down the United States, satellite servers may be utilized that are spread across the US, or somehow closer to the estimated device location. This may occur on an initial iteration of a device location method, or on subsequent iteration of a device location method after device location has been estimated during an initial or previous iteration.

The geographic location of the satellite servers may be known. For instance, the exact or approximate latitude and longitude of the satellite servers may be known. In some instances, satellite servers may be selected based on known locations, or a tracker or signal may be provided that may inform a master server of the location of the satellite server. The relative positions of the satellite servers may be known. These positions may be relative to one another, or to a reference point.

Figure 8:
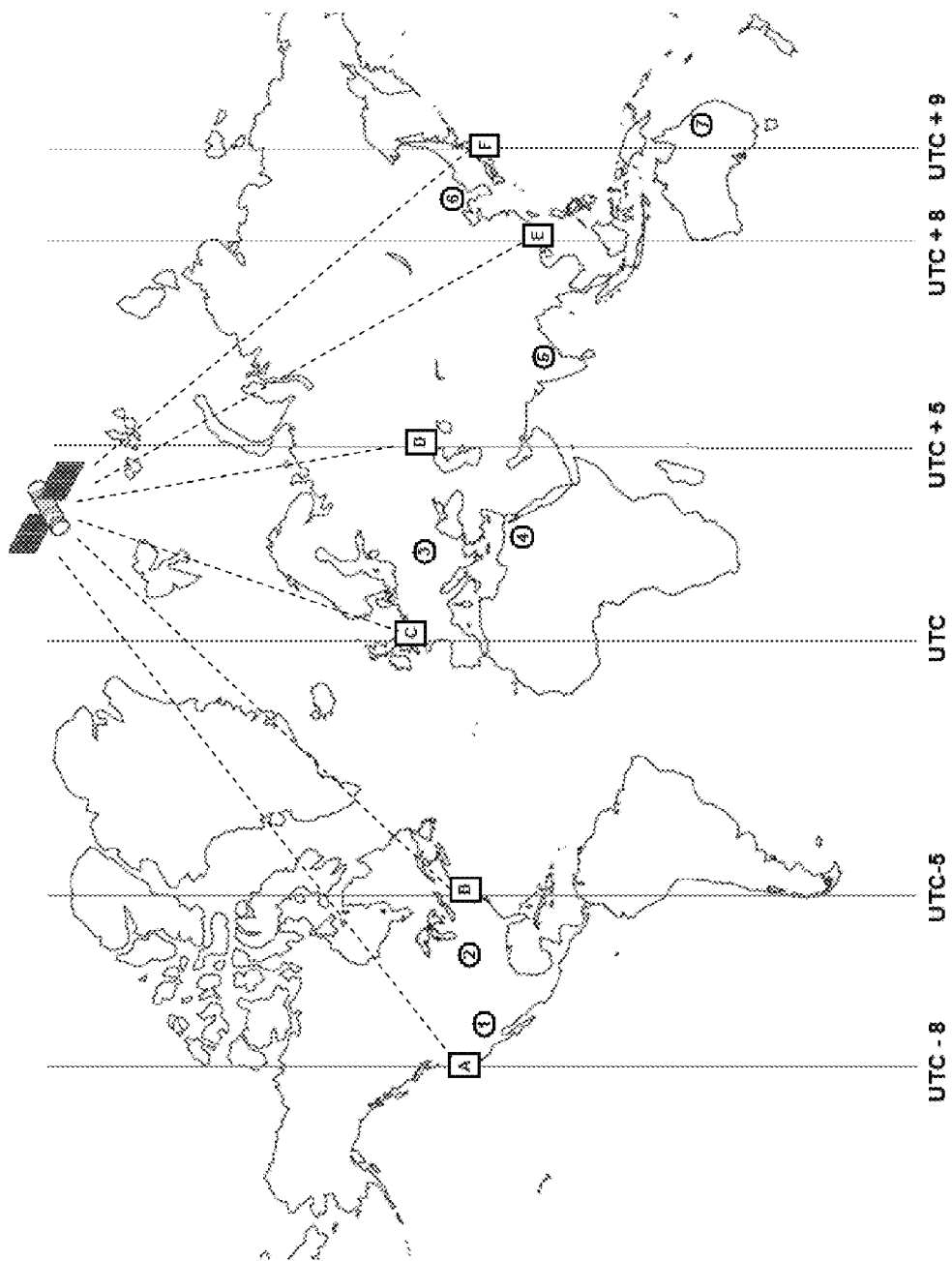
FIG. 8 shows a plurality of satellite servers and a plurality of user devices, wherein the satellite servers may be synchronized.

The satellite servers may all be time-synchronized. For instance, a UTC time generator may be strategically placed in servers around the world. FIG. 8 shows an additional example of where satellite servers around the world in various time zones (e.g., satellite servers A-F) may be synchronized via satellite. A plurality of user devices (e.g., user devices 1-7) may also be located globally, and in various time zones. In some embodiments, satellite servers may be synchronized to UTC time. In other embodiments, satellite servers may be synchronized to any other reference time. This reference time may be a time at another time zone, or may be any arbitrary time. Any synchronization techniques known in the art may be used. For example, the servers may be synchronized via a network time protocol (NTP).

In alternate embodiments, the satellite servers may not be synchronized, but the offset in time between the servers may be known. For example, if it is known that a server in New York is three hours ahead of a server in California, that offset is tracked and taken into account for calculations. In some instances, the offset may be measured between the servers directly, or between the servers and a reference time, such as UTC time.

In some instances, the satellite servers may be owned or operated by the same entity as the entity that owns or operates the master server or the host server. In such situations, it may be easier to synchronize the satellite servers. In some instances, satellite servers that may be owned or operated by other entities may be utilized, in which case it may be more difficult to synchronize the satellite servers. In some instances, it may be useful to utilize pre-existing servers as satellite servers because they may be available in large numbers and/or many locations. The method used to determine device location may advantageously be applied to servers without special configurations required. In those situations, the offset between the pre-existing or independently existing satellite servers may be determined, whether in reference to one another, or to another reference time.

The satellite servers may be regularly synchronized, or the offset regularly determined so that time measurements provided by the servers may be relatively accurate and precise. This may minimize the effects of clock skew.

A master server may be synchronized with the satellite servers as well, or the offset between the master server and the satellite servers may be tracked. Similarly, a host server may be synchronized with the satellite servers, or the offset between the host server and the satellite servers may be tracked.

Although at least one host server, at least one master server, and a plurality of satellite servers are described, the various servers may take on the functions of other servers. For example, a host server or a master server may be utilized as a satellite server. Or in some instances, a host server may have some or all of the functionality of a master server. Thus, not all of the servers described are required.

A user device may be configured such that a user may interact with the user device. The user may use a user device to access a host. In some instances, a host may provide a web page that may be displayed on the user device. The user may be accessing the host's page through a web browser. When a user browser accesses a host page, the host may send a request to a master server for one or more GUID. This may occur in any way known in the art. In one example, when a web page is served to a browser, a few links may be embedded in the page. A server (such as the master server or the host server) may assign a GUID to each page request. The GUID with the links may result in the user device making a request for an item identified by the GUID to satellite servers provided by the links. An example of this is provided in greater detail below.

The links can be dynamically served (each time a different combination of satellite servers), or static (each time the same satellite servers). The number of links may correspond to the number of satellite servers. The user may be requesting an item from each of the satellite servers designated by the links. The item requested may correspond to a GUID with each request to each satellite server. These requests may be made through the browser. The request may have any format known in the art. For example, the request made through the browser may have an HTTP format, and may utilize HTTP request commands, such as GET, HEAD, POST, or PUT.

The item requested may be any file or object, including but not limited to figures, image files, or files of known size. The item requested may be any resource request, such as a GET/POST request, any HTTP request, file request, image request, and so forth. For example, the item requested may be .gif file, a .jpg file, a .bmp file, a .tiff file, a .doc file, a .txt file, a .pdf file, .mp3 file, a .mpeg file, or any other file of any type known in the art. In one example, an item requested may be a 1×1 pixel, or an image of a known size, such as a 10×10 image, 50×50 image, or 100×100 image. In some instances, the item requested may actually exist at the satellite server. For example, a satellite server may be known to have a particular 1×1 pixel. In some instances, the item requested may not exist at the satellite server from which it is requested. For example, the item requested may be intentionally known not to exist at the satellite server—e.g., a GUID may be provided of a very specific type and length (e.g., a long alphanumeric string), such that the chance of it being found at a satellite server is extremely low. Thus, an item request may be made for a "real" item or an "imaginary" item. The requested item may be designated by a GUID.

The various satellite servers may receive this request at various times. In some instances, the time of receipt of the request may correspond to the distance of the satellite server from the user device. The request may be made simultaneously or substantially simultaneously to the various satellite servers. In such cases, a satellite server that receives the request sooner may be closer to the user device than a satellite server that receives the request later. In some instances, the time it takes for the request to travel from the user device to the satellite server and the distance between the user device and the satellite server may have some relationship. In some instances that relationship may be mathematical relationship, such as a linear or substantially linear relationship (where some variation may be provided). For example, if it takes twice the amount of time for a request to get from a user device to satellite server A as it does to get from the user device to satellite server B, then satellite server A may be roughly twice as far from the user device as satellite server B is. In some instances, the distance/time relationship may depend on network conditions at the time. In some instances, the latency of the network may involve how long it takes a known file size from a known location or to a known location to travel. For example, the known file size may be the same as or similar to the file size for the request. A known location may be at or near the device location, or at or near a satellite server location. For instance, a calibration step may determine the network latency by determining how long a known file size may take to travel from the device location to the satellite server location.

Any discussion herein where a time may be determined may take place by any methods or techniques known in the art for determining the time that an event takes place, or a current time. For example, when an event occurs (such as a satellite server receiving a request for an item), the server or device may have a local clock or may access a remote clock that may provide the time that the event took place. In order to store the time that the event took place, a timestamp may be stored, either locally or remotely. For example, when a satellite server receives a request for an item, a timestamp at that time may be stored on a memory for the server. Similarly, when determining the offset between two servers, devices, or any combination thereof, the local clocks at each of the servers or devices may provide a time. These times may be stored as timestamps. These timestamps may be stored at the servers or devices and may be compared at another server or device to determine the time offset.

In some embodiments, the time may be made by making a time request. A time request may or may not request another item. In some embodiments, the device may request a timestamp or other indicator of time from a satellite server. In some instances, the request need not be for any item, but a timestamp or other indicator of the time may be generated.

The utilization of an item request to determine the time latency between a user device and a satellite server may be advantageously more universal or accessible over prior art systems, which required the use of commands such as pings or trace routes. While commands such as pings or trace routes require that the recipient of the command be receptive to the command, systems (such as servers or devices) receive requests from a browser. Many servers today have many security features that minimize data accessed from an external system, which means that many servers today are configured to not receive or respond to a ping request or a trace route. Even if a server or device receives a request and does not have the item requested, it still receives the request, and may send a response that it does or does not have the requested item. Commands, such as ping, when executed, send data and measure the time for a response. By contrast, an item request may ask a device to "fetch something" but need not "get" anything.

Item requests, or any other requests sent from a browser is also a less intrusive means of communicating with another device or server. Unlike commands like ping or trace, this does not go into packet level data. Pings may be distributed in IMCP packets, which may be used to monitor networks. While Ping is a command that is issued, the system may utilize anything that a browser can "ask for" as normal conduct on the web. Typically pings are not issued through browsers, but instead are issued through commands, such as DOS, or unix. Such requests by browsers may not alert a firewall, anti-virus, and the like.

Thus, a request for an item from a user device to satellite servers may provide a more reliable way of determining the location of a user device in relation to the location of the satellite servers. Based on the locations of the satellite servers and the time that the satellite servers received the item request from the user device, triangulation techniques may be utilized to determine the location, or approximate location of the user device. Such techniques will be discussed in greater detail below.

For example, a first satellite, second satellite, and third satellite may be configured to receive an item request from a user device. A location calculator may be provided for determining the geo-location of the user device based on the relative geo-locations of the first, second, and third satellite servers and the amount of time it took for the first, second, and third satellite server to receive the object requests from the client device. In some embodiments, the location calculator may be provided for a master server, while in other embodiments, the location calculator may be provided for a host server.

Figure 2:
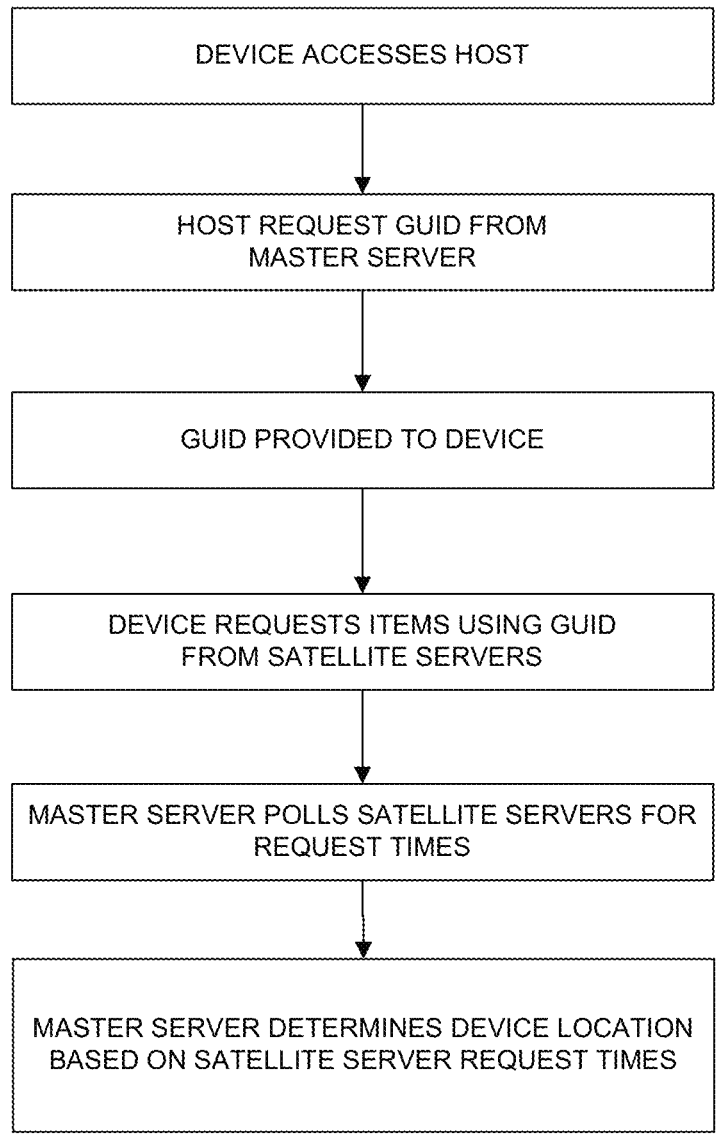
FIG. 2 is a flow chart for a method for locating a networked device in accordance with an embodiment of the invention.

FIG. 2 is a flow chart for a method for locating a networked device in accordance with another aspect of the invention. A user device may access a host server, which may request a GUID from a master server. The GUID may be provided to the user device. The device may request items from satellite servers using the GUID. The master server may poll the satellite servers for the request receipt times. Based on the request receipt times, the master server may determine the location of the device. Such a series of steps, as shown in the flow chart, may provide one example of an iteration of a device location method. Any of the steps described may be optional, or variations may be provided, whether such variation are provided in the sequence of steps or the steps themselves.

A user device may access a host server. Preferably, a user may be accessing a web page of a host server through a browser on the user device. For example, if a host is a financial institution, the user may be accessing an online banking website. When accessing the website an authentication page may be provided. The web page accessed by the browser may have a few links embedded in the page. For example, the banking authentication page may have some number of links embedded in the page. In one example, there may be five links embedded in the page, which may correspond to five satellite servers. When the host server links to the browser, a unique request number may be provided, or a request number that may be substantially or unique or somehow descriptive of the transaction may be provided.

In one embodiment, the host server may request a GUID from a master server. In some instances, the master server may always provide the same GUID. Alternatively, the master server may provide different GUIDs on different occasions. The same GUID may be provided for each of the links, or different GUIDs may be provided for each link. A GUID may be assigned to each page request. In an alternate embodiment of the invention, the host server may not need to utilize a master server for the GUID and may provide the GUID for a link.

The GUID may be provided to the user device. Thus, the browser of the user device may be accessing a web page with links that may include a request for the GUID. Alternatively, the GUID may be provided initially to the host server which may provide the links to the host web page. In some instances, the GUID may be provided to the user device through the host. The links can be dynamically served (each time a different combination of satellite servers), or static (each time the same satellite servers). For example, five links may be for five different servers, serving a requested item as designated by a GUID. If the links are statically served, the same five satellite servers may receive the request for every iteration of the method. If the links are dynamically served, the five satellite server may or may not differ in various iterations of the method.

In some instances, the five satellite servers may be selected based on known information, which may include information based on geographic information about the user device. For example, if the method was implemented once, it may be provide a rough area of where the user device may be based on satellite servers that are widely distributed globally. A subsequent iteration may narrow down the location of the user device and utilize satellite servers that may be located closer to the estimated location of the user device. Any number of iterations may be provided to narrow down the user device location. Similarly, if an error occurs such that the user device location is indeterminate, additional iterations of a device location method may be implemented using different servers.

The device may request items from satellite servers using the GUID. In a preferable embodiment of the invention, the device may make a simultaneous or almost simultaneous request to the satellite servers. In other embodiments, the requests may not be simultaneous, but times that the requests were made may be tracked. The satellite servers may make note of the time that they received the requests. In some instances, the device may receive a response to the request. For example, if the device requested a "real" item, such as a 1×1 pixel or other image, the satellite server may provide the item if it can. In another example, if the device requested an "imaginary" item, or a "real" item that can not be produced, the satellite server may provide a response that such an item can not be provided.

The master server may poll the satellite servers for the request times. In some alternate embodiments, a host server may ask the satellite servers for the request times. Preferably the master server may be asking the satellite servers for the time that the satellite servers received in the request. In some instances, the master server may be asking the satellite server for the time that the satellite server sent a response to a request.

The polling may occur after a specified period of time. For example, it may be unclear how long it will take for a request from a user device to reach a satellite server and/or for the satellite server to send a response. The polling may take place after a period of time considered sufficient for the satellite server to have received a request. For example, the polling may take place about five seconds after a request is made. Or the polling may take place some period of time after a master server provides a GUID (e.g., polling may take place 7 seconds after the master server provided a GUID). Or polling may take place some period of time after a master server receives a notification from a user device or host that a request has been made (e.g., 3 seconds after the master server receives notice that a request has been made). Thus polling may take place any amount of time, such as 1 second, 2 seconds, 3 seconds, 4 seconds, 5 seconds, 7 seconds, 10 seconds, or 15 seconds, after some event takes place. In some instances, the polling may occur round-robin style. Alternatively, the polling may occur more or less simultaneously.

In some embodiments, the satellite servers may notify a master server or host server of when they received the request. For example, right after a satellite server receives an item request, it may notify the master server that it received the item request and/or at what time it received that request. In such situations, the need for polling may be eliminated, although polling may occur in some instances.

Based on the request receipt times, the master server may determine the location of the device. In some embodiments, the master server may determine the location of the device based on the difference between the request receipt time and a request reference time. Thus the time for the request to travel over the network from the device to a satellite server may be determined or approximated. In such situations, the requests may or may not be made simultaneously to each of the satellite servers.

Preferably, the request reference time may be the time that the request was made. In some embodiments, the user device may be synchronized with the satellite servers or the offset between a user device and satellite servers may be known or determined. For example, the time at user device provided by a clock of the user device may be compared to any reference time, such as UTC time, or a satellite server time provided by a clock at a satellite server, or a master server time provided by a clock at a master server. Thus the time that a request was made at a user device may be provided. The satellite receipt time may be compared with the request time to determine the length of time it takes a request to travel from the device to the satellite server.

The request reference time may also be when the host server receives a notification from the device that a request has been made to the satellite servers. For example, when the user device sends a request to the satellite servers through the browser, the host server may be notified that a request has been made. In preferable embodiments, the host server may be notified that a request has been made after very little or no time lapse. Preferably, the host server may be synchronized to a satellite server or master server, or the offset between the host server and other servers may be known or measured. The satellite receipt time may be compared with the time the host server is notified of the request to approximate the length of time it takes a request to travel from the device to the satellite server. In some instances, the amount of time that it takes a host server to be notified of a request may be known, approximated, or measured, and may be used as an offset to approximate the travel time from device to satellite server.

The request reference time may also be when the master server receives a notification from the device that a request has been made to the satellite servers. For example, when the user device sends a request to the satellite servers through the browser, the master server may be notified that a request has been made. The user device and/or host server may notify the master server of the request. In preferable embodiments, the master server may be notified that a request has been made after very little or no time lapse. Preferably, the master server may be synchronized to a satellite server, or the offset between the master server and other servers may be known or measured. The satellite receipt time may be compared with the time the master server is notified of the request to approximate the length of time it takes a request to travel from the device to the satellite server. In some instances, the amount of time that it takes a master server to be notified of a request may be known, approximated, or measured, and may be used as an offset to approximate the travel time from device to satellite server.

Alternatively, the request reference time may be the time that the master server may have provided a GUID or received a request for a GUID. In preferable embodiments, the user device may receive a GUID and send a request to the satellite servers after very little or no time lapse from when the master server sends a GUID. Preferably, the master server may be synchronized to a satellite server, or the offset between the master server and other servers may be known or measured. The satellite receipt time may be compared with the time the master server sent the GUID to approximate the length of time it takes a request to travel from the device to the satellite server. In some instances, the amount of time that it takes a user device to make a request to satellite servers after a master server provides a GUID may be known, approximated, or measured, and may be used as an offset to approximate the travel time from device to satellite server.

In some alternate embodiments, the master server may determine the location of the user device based on the satellite servers' request receipt times without reference times. For example, a master server may be able to calculate the request time based on the relative satellite server request receipt times and the location of the satellite servers. In such situations, preferably, the request is made substantially simultaneously by the browser to each of the satellite servers. For example, a relationship between physical distance and time delay may be calculated or approximated. For example, if satellite server A is a known distance from satellite server B, and the satellite servers are synchronized or have a known offset, the amount of time it takes for a request to travel from satellite server A to satellite server B may be determined. Based on such information, the distance/time relationship may be utilized so that the difference in request receipt time by the various satellite servers may be translated to distance. For example, if satellite A receives the request 2 seconds before satellite B receives the request, this may mean that the device is some d distance closer to satellite A, where d may depend on the distance/time relationship.

Thus, when more satellite servers are provided, the relative locations of the satellite servers are provided, and the difference in request receipt time between the satellite servers are provided, then the difference in distance between the user device and each of the satellite servers may be determined, which may be combined with a triangulation technique to determine the location of the user device relative to the satellite servers. In such situations, preferably, the item request may be made simultaneously from the user device to each of the satellite servers.

Based on the travel time between a device and satellite server, or the relative request receipt times of the satellite servers, and the locations of the satellite server, triangulation techniques as known in the art may be utilized to determine the physical location of the user device. Such triangulation techniques may incorporate spherical concepts of a great circle. See, e.g., http://en.wikipedia.org/wiki/Great_circle, which is hereby incorporated by reference in its entirety. The use of triangulation will be discussed in further detail below.

Figure 3:
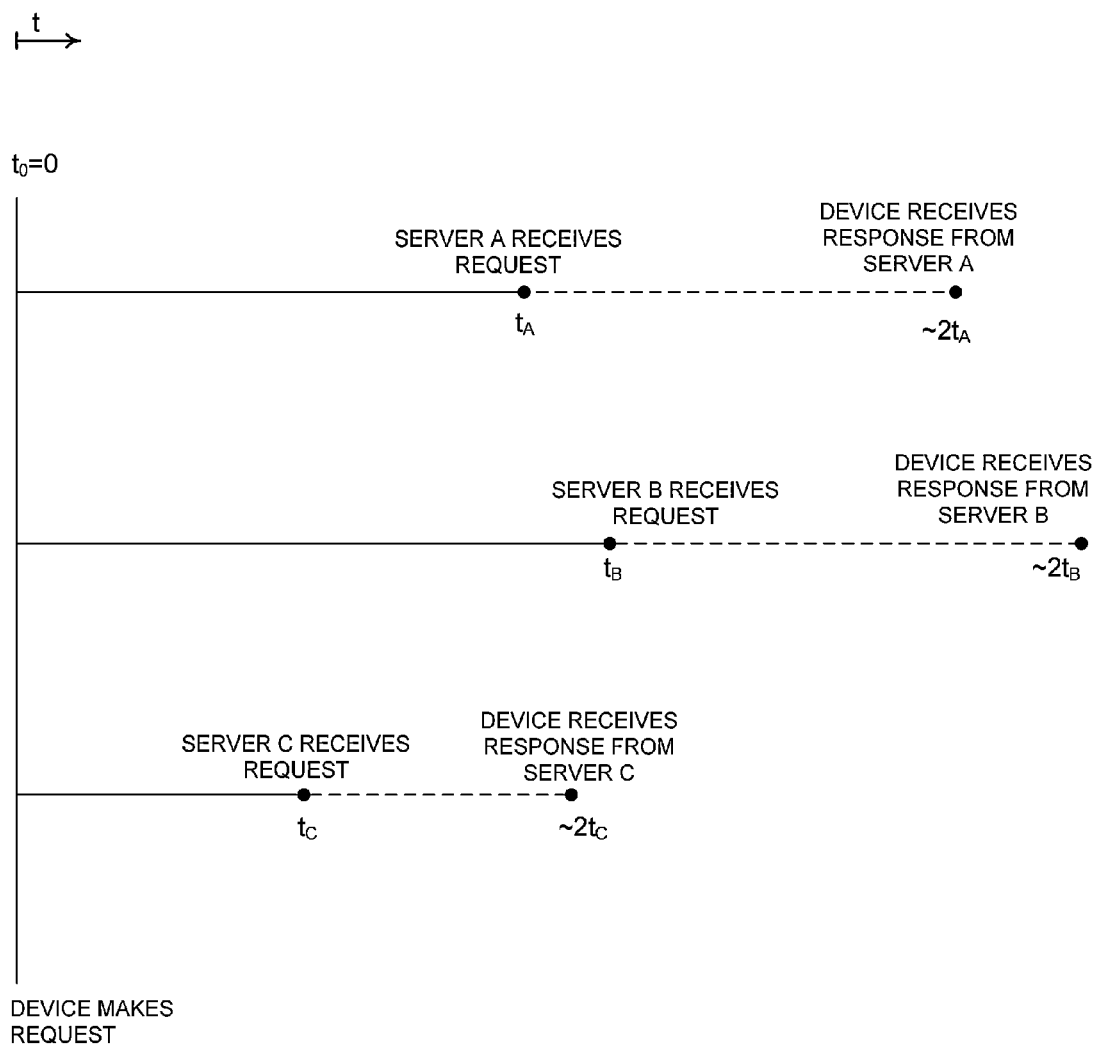
FIG. 3 shows parallel events that may occur in the context of time.

FIG. 3 shows parallel events that may occur in the context of time. For example, at an initial time, $t_0$, a device may make a request for an item. Satellite server A may receive the item request at a time $t_A$. Similarly, satellite server B may receive the item request at time $t_B$, and satellite server C may receive the item request at time $t_C$. Since $t_C < t_A < t_B$, this may indicate that satellite server C is closest to the user device and that satellite server B is furthest from the user device. In some embodiments, a satellite server may send a response to the user device. For example, if the device requests an item, the satellite server may send back the item, or some form of response indicating that it is unable to send the requested item. In some embodiments, this round trip time may be approximately twice the time it takes for the satellite server to receive the request. Thus, the device may receive a response from server A at a time $\sim 2t_A$, the device may receive a response from server B at a time $\sim 2t_B$, and the device may receive a response from server C at a time $\sim 2t_C$, assuming that $t_0=0$. Otherwise, the round trip time for satellite server A may be $\sim 2(t_A - t_0)$, and so forth.

In some embodiments, a user device may send a request to a satellite server. The time latency provided by a one way trip to the satellite server may be measured. In some instances, this may be done by comparing a satellite server request receipt time (e.g., $t_A$, $t_B$, $t_C$) with the time the device makes the request (e.g., $t_0$). The time latency may be the difference between the request receipt time and the time that the request is made (e.g., $t_A - t_0$, $t_B - t_0$, $t_C - t_0$). To do this, both the satellite server request receipt times, and the device request time may be tracked. As discussed previously, other request reference times may be used as an approximation for the request time.

In other alternate embodiments, a user device may send a request to a satellite server and receive a response. Thus, the user device may be able to track when a request was made as well as when a response was received. In such situations, it may not be necessary to track when a satellite server received a request, although that information may be tracked anyway. Only the difference in times between the request time and the response receipt time may be needed to determine the round trip time, the actual time this occurs may not be needed. The user device may be able to keep track of the round trip time by reference to the user device clock, without having to consider synchronization time or offsets with other devices or servers. Thus, in such situations, the various sensors need not be synchronized, nor need any server time be tracked. Thus, the time latency provided by a round trip (e.g., $\sim 2(t_A - t_0)$, $\sim 2(t_B - t_0)$, $\sim 2(t_C - t_0)$) between a user device and satellite server may be determined. A one way trip time may be approximated from a round trip time as being about half the round trip time.

In some implementations, a device may make a request for an item, such that not all requests are made simultaneously. For example, rather than all satellite servers sharing a request time of $t_0$, they may have different request times (e.g., $t_{0A}$, $t_{0B}$, $t_{0C}$) such that the latency can be determined with reference to those request times (e.g., $t_A - t_{0A}$, $t_B - t_{0B}$, $t_C - t_{0C}$).

In various other embodiments of the invention, the method described may be operated in reverse. For example, a satellite server may request an item from a user device. The times that the satellite server makes the request and that the user device receives the request may be determined to calculate the one-way trip time. Any considerations that apply to when a user device requests an item from a satellite server may also apply in this situation. Similarly, a satellite server may request an item from a user device and may receive a response from a user device. The times that a satellite server makes an item request and that the satellite server receives a response may be used to calculate the round trip time. Any considerations that apply to when a user device requests an item from a satellite server and receives a response may also apply in this situation.

In other embodiments of the invention, the method described may be operated in reverse in the sense that rather than requesting an item from a satellite server, a user device may request to upload an item to the satellite server. In some instances, the satellite server may send a response allowing upload or denying the upload. For example, a POST or PUT request may be provided. Any type of request may be made by a user device to a satellite server, whether it is to receive an item, or to provide an item, or otherwise communicate with the satellite server. Such requests may be provided through the user device browser, and may have a browser format, e.g., HTTP request.

Figure 10:
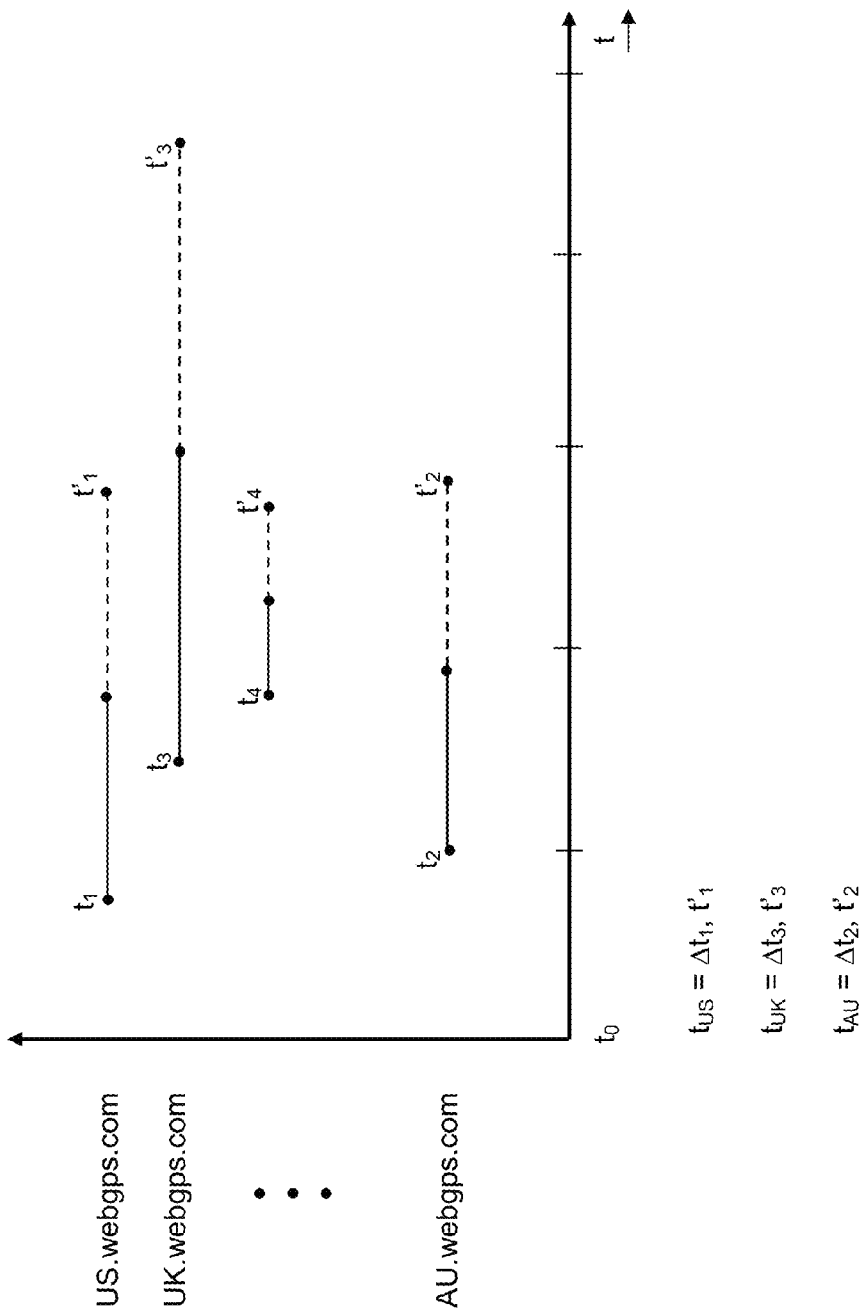
FIG. 10 shows an example of parallel events that may occur when relative delta of time is computed for each request.

FIG. 10 shows an example of a device instructed to request anything from satellite servers and how the relative times of each download's round trip may be used to rank the speed of the traffic from the end device to each satellite server. A request may be for anything, including anything described elsewhere herein, such as an item, object, partial request, or a request for nothing. A request could be an HTTP request or other type of request. The request may go down to the TCP stack level, for example. A relative delta of time may be calculated for each server by computing the difference between the server time at arrival of a request and the server time upon completion of a defined TCP/IP protocol operation, such as SYN/ACK or complete object download. This may allow the measurement of relative delta of times from the device to each server.

For example, a first server may be provided at US.webgps.com. A device may make a request at $t_1$, and may receive a response (which may or may not include an item request) at $t'_1$. The delta of time may be calculated based on the difference between $t_1$ and $t'_1$. The amount of time for a request to travel $t_{US}$ to US.webgps.com may be based on the calculated delta of time. A second server may be provided at UK.webgps.com. A device may make a request at $t_3$, and may receive a response (which may or may not include an item request) at $t'_3$. The delta of time may be calculated based on the difference between $t_3$ and $t'_3$. The amount of time for a request to travel $t_{UK}$ to UK.webgps.com may be based on the calculated delta of time. As shown, the times that the request is made, (e.g., $t_1$ and $t_3$) need not be the same for each server, although they may be. Also, the larger delta of time corresponding to $t_{UK}$ may be greater than $t_{US}$. This may indicate that the device is further from the UK server than from the US server. In some embodiments, the round trip travel time may be calculated according to a clock on the device, if the device makes the request to a server and receives a response. In alternate embodiments, the round trip travel time may be calculated according to a clock on a server, if the server makes a request to the device and receives a response.

Calculating a round trip time, or the amount of time that a request travels and a response is received, may allow the calculation of a relative amount of time (e.g., delta of time). The absolute times that the events occur (e.g., the actual time of request or actual time of response receipt) may not be needed. Even if requests are not made at the same time, the amount of travel time for the request may be measured. This may assist with determining which satellite server is closest to the device, and the relative amount of distance between each satellite server and the device. In some embodiments, the delta of times and/or relative distances may be sorted and ranked (e.g., from closest server to the device, to the furthest server from the device). This may eliminate a need for clock synchronization or to keep track of any clock offsets.

FIG. 13 shows an example a table with requests made and time deltas between a device and servers. In accordance with one embodiment of the invention, satellite servers may be provided in strategic places around the world. For example, time servers (which may also be referred to as satellite servers) may be provided in Los Angeles, New York, London, Tokyo, and Hong Kong. These servers could be aptly named: LA.WebGPS.Com, NY.WebGPS.com, UK.WebGPS.com, JP.WebGPS.com, HK.WebGPS.com, or have any other names that may identify or distinguish these time servers from other servers.

The amount of time that it takes for a request to travel from a device to a satellite server (or the amount of time for a request to be made from a device to a satellite server and for a response from the satellite server to be received) may be provided as a time delta. The time delta may be on any order of time (e.g., nanoseconds, microseconds, milliseconds, seconds, minutes, hours). For example, it may take a millisecond for a request to travel from the device to a server in LA. It may take 13 milliseconds for a request to travel from the device to a server in Hong Kong. This may demonstrate that the device is closer to the LA server than the Hong Kong server.

Figure 4:
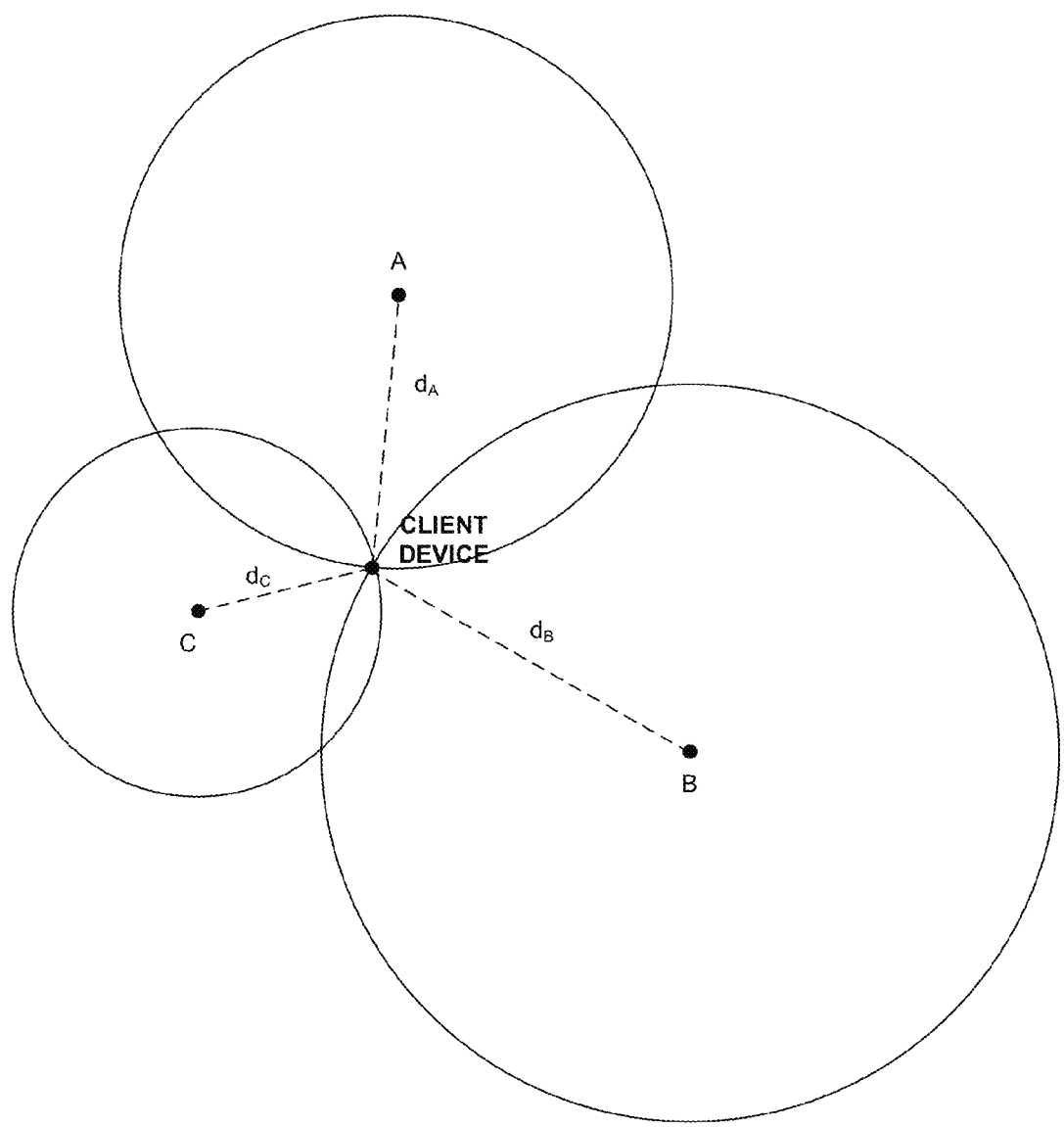
FIG. 4 shows an example of a 2D triangulation technique to locate a device.

FIG. 4 shows an example of a 2D triangulation technique to locate a device. For example at least three satellite servers may be provided. As shown in the figure, these may be denoted as satellite server A, satellite server B, and satellite server C. A client device may be provided that has some location relative to satellite servers A, B, and C. As shown in FIG. 3, a time latency may be determined between a request made and received between the client device and satellite servers. For instance, if $t_C - t_0 < t_A - t_0 < t_B - t_0$, then $d_C < d_A < d_B$. Although this may not be true in every situation, e.g., the network may be slower in some sections than in others, overall there may be a correlation between latency and distance.

An approximate relationship between distance and time may be determined. In some embodiments, a linear relationship may be provided, such that distance may be directly proportional to time. For example a distance d may equal n×t, where n is any real number and t is the time latency. However, it may be determined that other relationships may be a more accurate portrayal of the distance/time comparison. For example it may be that distance has a quadratic relationship with time, or vice versa, or any form of exponential relationship with time, or any other type of mathematical relationship with time. This may be determined using tests with servers at known locations, or various models may be implemented.

Thus, based on the time/distance relationship, $d_A$, $d_B$, and $d_C$ may be determined. Circles with radii of these distances may be drawn, and where they intersect may be where the client device is located. This intersection point may be where a client device can be $d_A$ away from server A, $d_B$ away from server B, and $d_C$ away from server C.

In some alternate embodiments, where time latency may not be known but relative satellite server request receipt times may be known, triangulation techniques need not utilize circles, but may utilize other shapes such as lines, arcs, or ellipses. For example, if satellite server A is known to receive a request some time increment $t_1$ after satellite server B, then based on the distance, time relationship, it may be approximated that satellite server A is about $d_1$ further from the client device than satellite server B. Given that the locations of satellite servers A and B are known, the locations where an object is $d_1$ further from satellite A than satellite B can be mapped out. If satellite C and B receive the request at the same time, then the client device may be the same distance from satellite B and C, any positions of which may denote a line equidistant from B and C. Similarly, with the use of at least three non-linear satellite servers, the intersection point can be determined.

In some embodiments, at least three satellite servers may be used. In some instances it may be preferable to use a larger number of satellite servers (e.g., 5-20 satellites, etc.). Although an approximate relationship between time and distance may be provided, it may not be completely precise. Similarly, the time latency calculations may not be completely precise. Thus, when triangulation methods are used, there may be situations where the circles do not overlap perfectly at a point. The use of additional satellites may provide a better sense of where the circles mostly overlap. Furthermore if there is an anomaly or error in one or several time latency measurements or distance relationships, it may be easier to spot it with additional data points.

As discussed previously, satellite servers positioned globally may be preferable for an initial attempt at locating a client device, unless it is known that a client device is coming from a particular region. In some instances, satellite servers that may be closer together to an expected region for a client device may be utilized to get a more precise determination of the client device location.

If a significant number of anomalies are detected, or some form of error is detected, then it may be preferable to do another iteration of a device location method. In some instances, this may be done using the same satellite servers, or using different satellite servers. If an error or anomaly is detected for one or more particular satellite servers, those satellite servers are preferably swapped out for other ones in the next iteration.

Figure 9:
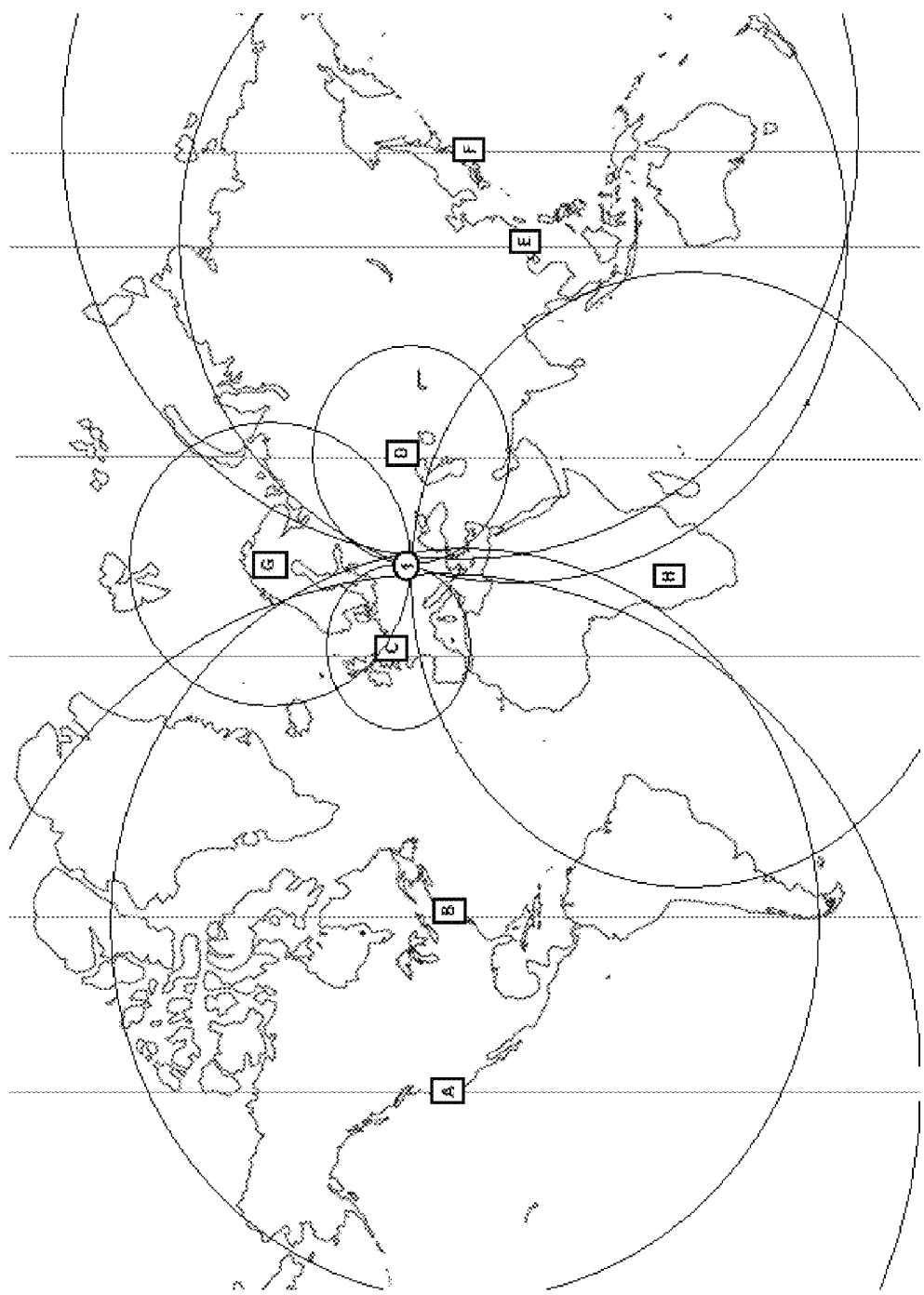
FIG. 9 shows an example of using a triangulation technique in a global setting.

FIG. 9 shows an example of a triangulation technique utilized in a global setting. In an initial iteration, when user device (1) being located, satellite servers from around the world (e.g., satellite servers A-H) may be utilized. In an initial iteration, sometimes the location of the user device may be determined with varying degrees of accuracy. In some instances, a single iteration may be sufficient to determine the location of the user device to within a predetermined tolerance. In other instances, additional iterations may be required. For example, if the initial iteration were to yield a general location of user device (1) as being located somewhere in Europe, additional satellite servers in that region may be employed to narrow down the location of user device (1).

Figure 11:
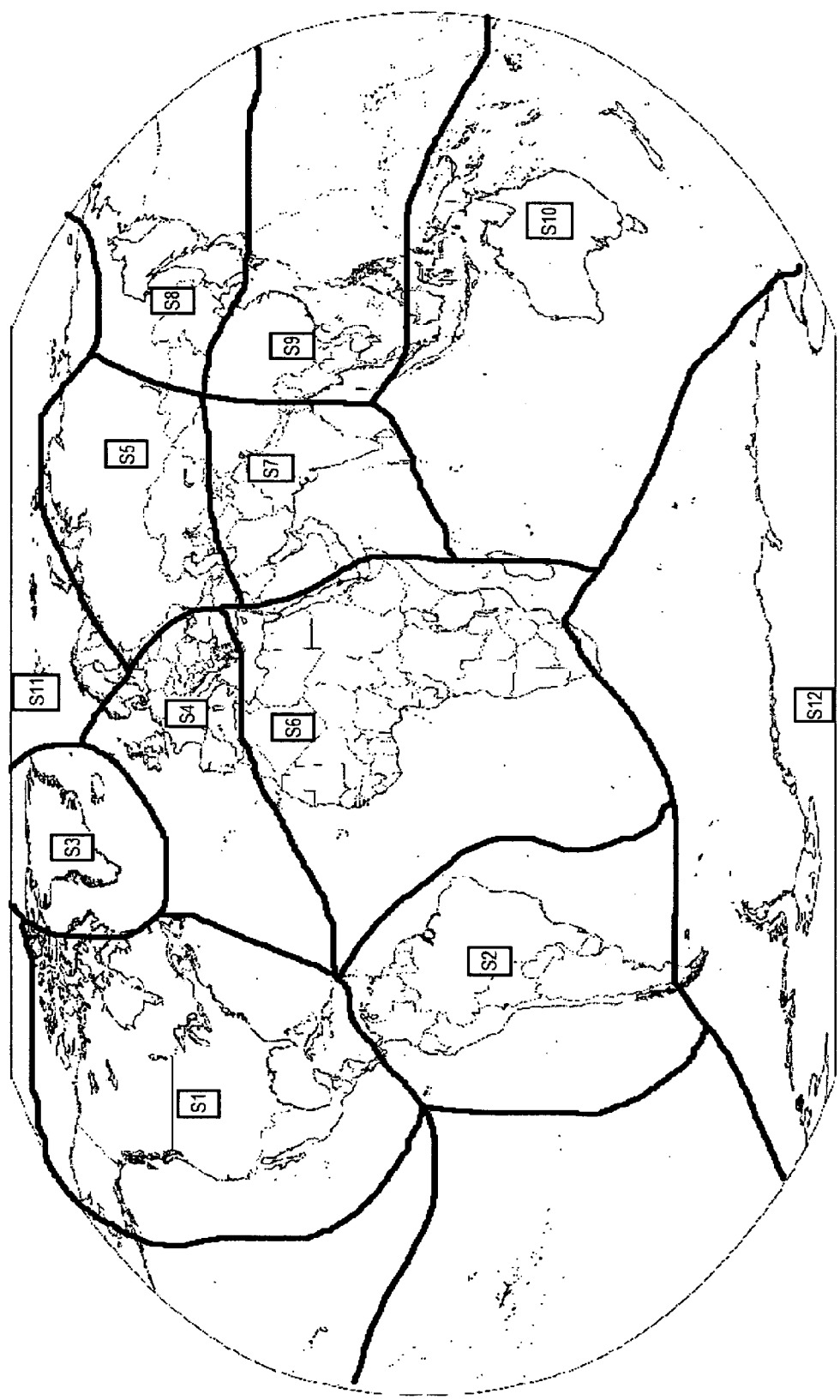
FIG. 11 shows a mapping of satellite servers to virtual panels on earth, in accordance with an embodiment of the invention.

FIG. 11 shows an example of dividing the globe into panels that may contain physical satellite servers (S1 through S12 as an example). In some embodiments, each panel may have a satellite server. In other embodiments, a panel may have multiple satellite servers. The panels may be of approximately equal size and/or shape. The panels may be more or less evenly distributed. In other embodiments, the panels need not have the same size or shape. The size, shape, configurations, and/or positions may vary from panel to panel. For example, as shown in FIG. 11, the panel for S3 may be smaller than a panel for S12. In some embodiments, in areas with higher network traffic or more servers or devices, the panels may cover a smaller area (i.e. more satellite servers may be provided in more dense areas).

Figure 12:
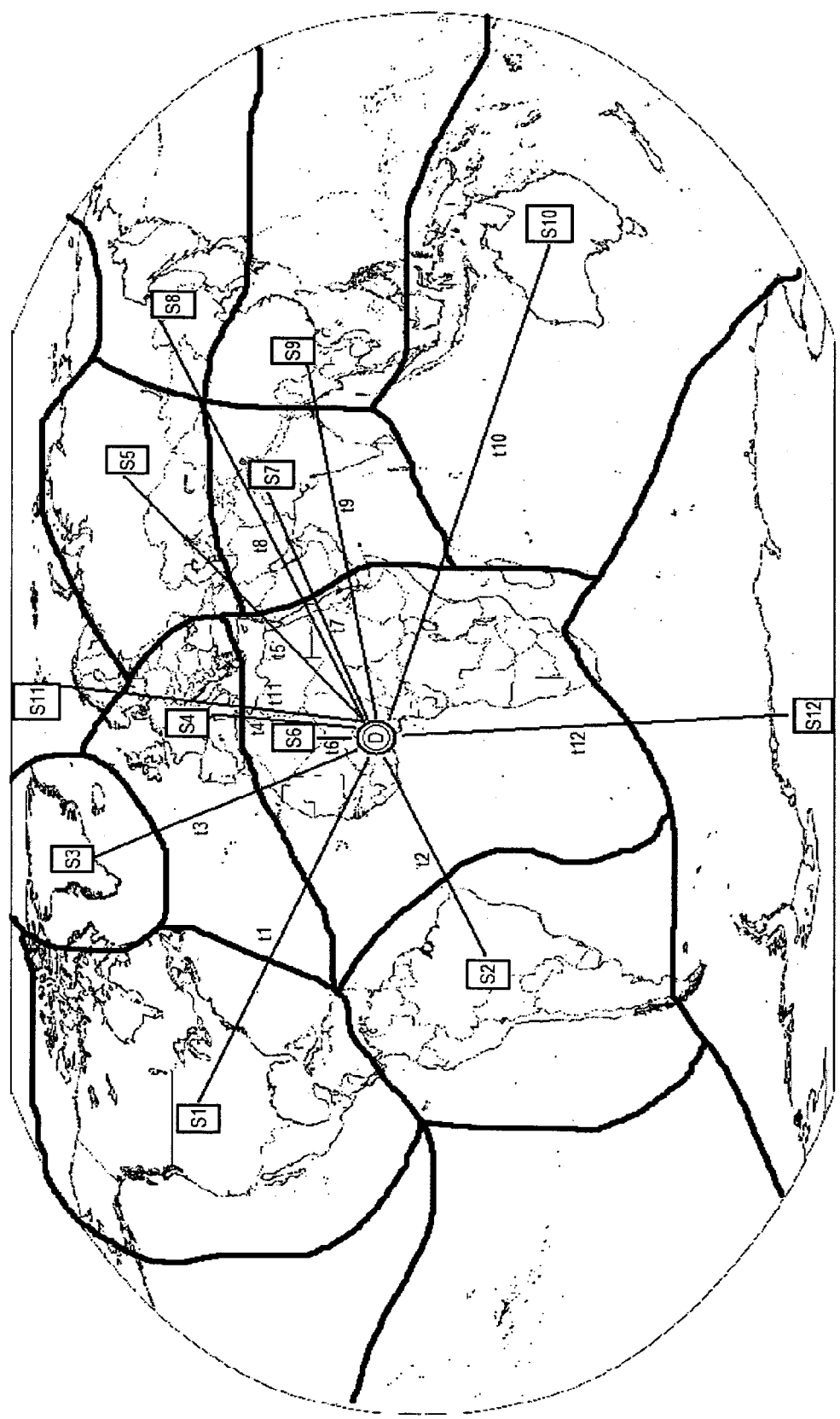
FIG. 12 shows a specific device mapped on a globe to a panel for location in accordance with an embodiment of the invention.

FIG. 12 shows a device coming from a location close to S6's panel and the relative times (t1-t12) of completing a request to each of the servers (S1-S12, respectively). Based on the shortest relative time (in this case, t6) the system may define that location of device D is close to S6. Some embodiments of the invention may allow for a high level geo-location of a device. For example, the location of a device in terms of which panel that device belongs to may be determined. Thus, device D may be determined to fall within the S6 panel or zone. In some embodiments, this may allow for an approximate location of a device without the use of triangulation. The closest satellite server to the device may be determined, and the device may be within the panel or zone of that satellite server. In some embodiments, the distance form the device to other satellite servers may be ranked or used to determine relatively location of the device from the closest satellite server, or to help with the geo-location of the device.

In some embodiments, this may be an iterative process. One or more levels of panels and/or subpanels may be provided. For example, if a device D is found within an S6 panel within a first iteration, a second iteration may include looking at one or more servers within the S6 panel. The S6 panel (and any other panel) may be further divided into subpanels. Each subpanel may have one or more satellite servers therein. The delta of times may be compared between the device and a satellite server within each subpanel. Based on said comparison, the device D may be determined to be located in a particular subpanel within the S6 panel. Any number of additional iterations may be performed as desired. For example, the subpanel in the S6 panel, in which device D is located may be further divided into sub-subpanels and so forth. An iterative process may be allow the location of the device D to be narrowed down to a smaller geo-point by repeating the process with a finer grid of panels.

FIG. 5 shows a table providing an example of various data points that may be collected. For example, if a client device is located at Palo Alto, U.S.A., satellite servers at the various listed locations may have a time lapse, between receiving the request and when the request was made, as indicated. For example, locations such as San Francisco or Santa Clara, are closer to Palo Alto, and therefore have smaller time latency than further locations, such as Mumbai and Johannesburg.

In some instances, the time latency may not directly correlate to a direct distance between a client device and satellite server locations, and some anomalies may be provided. However, there may be an overall trend or relationship where usually closer satellite servers may have a smaller time latency. This may be sufficient to determine an approximate location of the client device. Using a larger number of satellite servers may assist with pinpointing the location of the client device.

FIG. 6 shows a table providing another example of various data points that may be collected. For example, a start time and an end time may be collected. In some embodiments, the start times need not all be simultaneous. Based on the start and end times, a round trip time may be calculated. A one way trip time may be calculated from the round trip time. The one way trip time may be half the round trip time. The current link may be provided, which may show a satellite server being accessed and an item requested.

In some instances, the item requested may be an "imaginary" item. In some instances, such items requested that do not exist may also be ghost item requests or fake requests. For example, as shown in the figure, the GUID may be an alphanumeric string, such as FB61898D-E19B-49E2-B16106EA8246316E, which may be used to request an image that in very high-probability will not be provided by the satellite server. In this example, the same GUID may be used for each satellite server request, although in other embodiments, different GUIDs may be provided. Similarly, in some instances, "real" items may be requested.

Figures 7A, 7B:
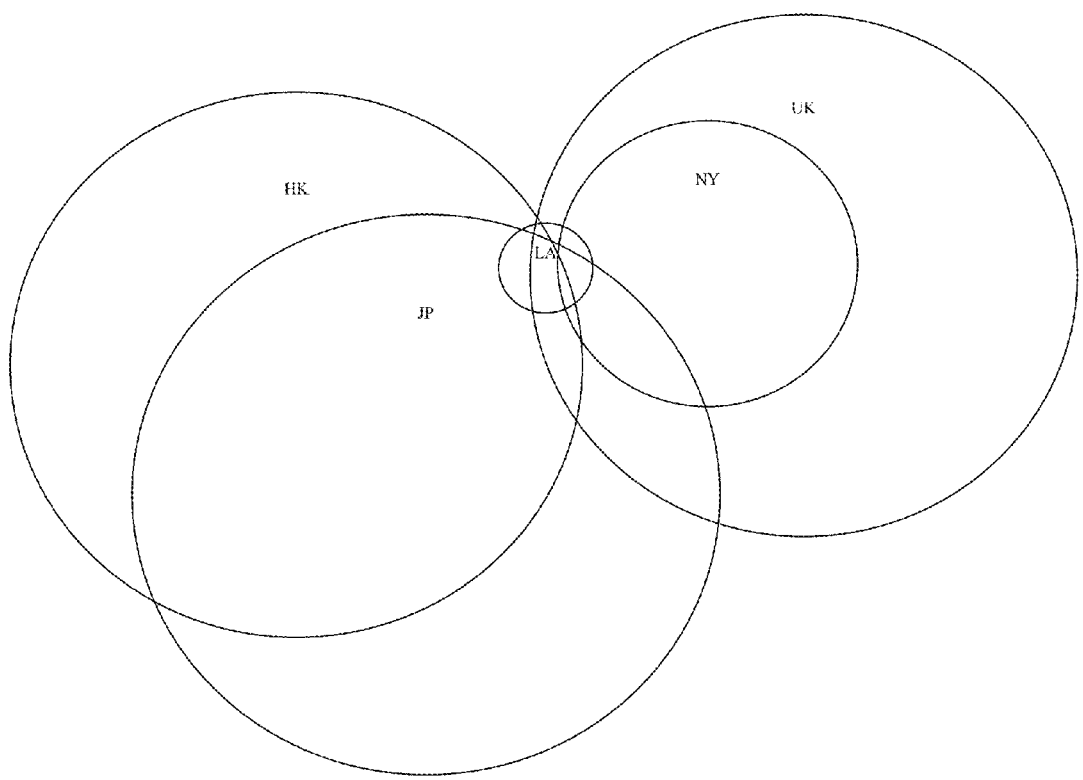
FIG. 7A shows a table with requests made and time that requests were received.
FIG. 7B shows an example of how request time may be applied to a triangulation technique.

FIG. 7A shows a table with requests made and time that requests were received at various satellite servers. In accordance with one embodiment of the invention, to obtain the distance sources, a UTC time generator may be provided in strategically placed servers around the world. For example, time servers (which may also be referred to as satellite servers) may be provided in Los Angeles, New York, London, Tokyo, and Hong Kong. These servers could be aptly named: LA.WebGPS.Com, NY.WebGPS.com, UK.WebGPS.com, JP.WebGPS.com, HK.WebGPS.com, or have any other names that may identify or distinguish these time servers from other servers.

Thus, when a network device requests an object from any of these servers, the network device's exact location (latitude and longitude), may be determined. Furthermore, each of the time servers in this array may be synched to UTC on a regular basis, to ensure maximum synchronicity.

When a web page is served to the network device browser, a few links may be embedded in the page. A server (e.g., a master server or host server) may assign a GUID to each page request, so which context is being calculated for the distance may be verified. The links can be dynamically served (each time a different combination of time servers), or static (each time the same time servers). For example, five links may be served from five different servers, serving small image files (1 pixel×1 pixel):

<img src=http://LA.WebGPS.com/12345.gif height="0"width="0"/>
<img src=http://NY.WebGPS.com/12345.gif height="0"width="0"/>
<img src=http://UK.WebGPS.com/12345.gif height="0"width="0"/>
<img src=http://JP.WebGPS.com/12345.gif height="0"width="0"/>
<img src=http://HK.WebGPS.com/12345.gif height="0"width="0"/>

In this example, the GUID is 12345, and that is what the browser may request of each of the time servers.

Because each request may be threaded on its own, and because the exact number of milliseconds it will take for all five small images to be downloaded may not be known, a time-buffer may be introduced before results are received. For example, 5 seconds (5,000 milliseconds) may be provided as a timeout, after which the results may be fetched.

The same server that provided the GUID (e.g., a master server or host server) can issue a request for the five time servers, to ask them "at what exact UTC time, did you get the request for file 12345.gif"? A master server (or alternatively a host server) may be able to provide the master server time, a way to query the time servers for their reading of a certain GUID file, a GUID generator, and access to three to five time servers in disparate and known locations.

Because of network latency, and sheer "physical distance" between the browser and these disparate servers, there will be a slight delay in milliseconds. This slight delay may provide a way to calculate the geo-location of the network device utilizing the browser, as data may be received as shown in FIG. 7A.

Such data may show the time server receiving the object request, as well as the object requested. For example, the time servers may be LA.WebGPS.Com, NY.WebGPS.com, UK.WebGPS.com, JP.WebGPS.com, HK.WebGPS.com, located in Los Angeles, New York, London, Tokyo, and Hong Kong respectively, as discussed previously. The UTC time at which each of the time servers receives the object request may also be provided as 1 millisecond, 5 milliseconds, 10 milliseconds, 12 milliseconds, and 13 milliseconds respectively.

FIG. 7B shows an example of how request time may be applied to a triangulation technique. One observation is that it appears that the browser first hit Los Angeles, and all the rest of the servers later. However, by placing all the distances in a 2D space, we can triangulate for a more exact position. During some executions of such requests, the results may not always be nice and perfect trilateration of real GPS, due to network latency, or variations in network speed.

Typically, real GPS, which has fewer moving parts, may provide a single point of intersection. In real GPS, typically one intersection point is possible, and it is that which allows the local quartz clocks on the GPS receiver to synch up regularly, without being as accurate as the atomic clocks on the satellites of a real GPS system.

However, in web GPS, as shown in FIG. 7B, the circles for triangulation may not all align at one single intersection point. However, they may provide an idea of the location of the network device and browser. For example, the network device may be fount to be located relatively close to LA. In some circumstances, the circles may all line up at a single intersection point.

Due to network latency, and network instability in general (traffic spikes), a "perfect" read may not always be provided from the time servers, nor a perfect triangulation each time. In addition to absolute geo-location, a relative geo-location may be determined. This means, that even if each time a device requests the five objects, different readings may be provided, and assuming that everything else being equal, the locate can be determined in relative terms, vs. exact terms.

Continuing with the example provided above, the location for a network device may be calculated as the same location as found previously, even with different sets of values for the time that a satellite server received a request:

http://LA.WebGPS.com/12345.gif UTC Time Jan. 1, 2009 00:00:00 002
http://NY.WebGPS.com/12345.gif UTC Time Jan. 1, 2009 00:00:00 010
http://UK.WebGPS.com/12345.gif UTC Time Jan. 1, 2009 00:00:00 020
http://JP.WebGPS.com/12345.gif UTC Time Jan. 1, 2009 00:00:00 024
http://HK.WebGPS.com/12345.gif UTC Time Jan. 1, 2009 00:00:00 026

In some instances, a network "test" or calibration may be utilized in close temporal proximity to an iteration of a device location method. For example, time latencies may be calculated between two or more time servers of known locations or relative locations to determine an updated distance/time relationship. This may occur soon before or after a device sends a request to time servers. The updated distance/time relationship may be useful in determining the location of the device based on relative time latencies or time server request receipt times.

Such calibration may occur as many times as desired. For example, it may occur for every iteration of a device location method. Alternatively, it may occur at regular time intervals or it may occur based on an event.

Any of the systems and methods described may be useful in determining the location of a network device. In some instances, the physical location of a network device may be determined. The physical location of the network device may be determined as an absolute geo-location, or may be determined relative to one or more time servers. Exact location or approximate location or region may be determined.

In some instances, virtual location, e.g., the location of the device on a network may be determined. The virtual location of the device on the network may be relative to the location of various time servers on the network.

Knowing the location of a network device may be useful for various applications, such as risk management, marketing, compliance, authentication and even locating an approximate location of a stolen device. For example, depending on the location of the network device, advertising may be targeted geographically. Similarly, knowing the location of a network device may be useful for authentication. For example, if a user claims to be at a particular location or a time zone is provided for the network device and the network device is not in the same region, which may raise concerns. Furthermore, if the location of the network device changes erratically, that too may raise a red flag.

The systems and methods described may combine a resource request with a triangulation method for the purpose of locating devices that are connected or connecting to a communications network. Such systems and methods may additionally be used to: provide input for an authorization process, which may determine if a user is entitled to receive a service (security); provide input for an identification process, which may determine from which device particular requests originated (security and audit); provide input for a demographics process, which may determine degree of user connectivity from geographic areas (marketing); and provide input for a tuning process, which may determine type of content or connection parameter settings for server-to-user sessions (performance).

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of determining a physical location of a device to help locate the unknown location of the device, comprising:
    sending a resource request from a network device;
    selecting three or more satellite servers, based on known locations of the satellite servers without regard to the unknown location of the device;
    receiving, at the three or more satellite servers, the resource request, and providing, from the at least three or more satellite servers, a response to the resource request;
    determining times when each of the three or more satellite servers receives the resource request;
    determining a physical location of the network device based on the relative known locations of the satellite servers and times when each of the satellite servers received the resource request using a triangulation technique that correlates the amount of time it took for the resource request to travel between the network device and an individual satellite server with a degree of physical distance; and
    selecting an additional three or more satellite servers, based on the determined physical location of the network device, for further determining the physical location of the network device.

2. The method of claim 1, wherein the times when each of three or more satellite servers receives the resource request are determined by: a master server polling the three or more satellite servers, or the satellite servers informing the master server that the request was received.

3. The method of claim 2, wherein the master server determines the amount of time it took for the resource request to travel from the network device to the three or more satellite servers based on the times the satellite servers received the resource request, and correlates the amount of time it took for the resource request to travel with distances between the network device and the satellite servers.

4. The method of claim 3, wherein the correlation is a linear correlation.

5. The method of claim 1, wherein at least two of the three or more satellite servers are in a different time zone.

6. The method of claim 1, wherein the resource request is sent from the network device to the three or more satellite servers at the same time.

7. A method of determining a physical location of a device to help locate the unknown location of the device, comprising:
    selecting, with aid of a processor, three or more satellite servers each positioned in one or more predetermined global zones, based on known locations of the satellite servers without regard to the unknown location of the device;
    determining, with aid of the processor, an amount of time it took for a resource request and response to the resource request to travel between each of the three or more satellite servers and a network device;
    determining, with aid of the processor, a global zone in which the network device is physically located based on the relative known locations of the satellite servers and the amount of time it took for the resource request and the response to the resource request to travel between each of the satellite servers and the network device using a triangulation technique that correlates the amount of time it took for the resource request and response to the resource request to travel between the network device and an individual satellite server with a degree of physical distance; and
    selecting, with aid of the processor, an additional three or more satellite servers, based on the determined global zone in which the network device is physically located, that can aid in further determining the physical location of the network device within the global zone.

8. The method of claim 7, further comprising the step of performing a calibration step to determine network latency.

9. The method of claim 8, wherein the calibration step includes determining the amount of time it takes for a known file size to travel to a second known location from a first known location.

10. The method of claim 9, wherein the first known location is the network device location and the second known location is a satellite server location.

11. The method of claim 7, wherein the amount of time it took for each of three or more satellite servers to receive a resource request is determined based on calculating the difference between the time the resource request was made by the network device, and the times that the network device received a response to the resource request from the satellite servers.

12. The method of claim 1, wherein the physical location of the network device is not based on capturing a time that the resource request is sent.

13. The method of claim 1, further comprising
receiving, at the additional three or more satellite servers, the resource request;
determining time when each of the additional three or more satellite servers receives the resource request; and
additionally determining the physical location of the network device based on the relative locations of the additional satellite servers and times when each of the additional satellite servers received the resource request using a triangulation technique.

14. The method of claim 7, wherein the amount of time it took for the resource request and the response to the resource request to travel between each of the satellite servers and the network device is the round trip time for a resource request to be sent by the network device to a satellite server, and a response to be sent by the satellite server to the network device.

15. The method of claim 7, wherein determining the physical location within the global zone of the network device is performed without relying on any satellite server times.

16. The method of claim 7 wherein the correlation is a linear correlation.

17. The method of claim 1, wherein at least two of the three or more satellite servers are selected from different time zones.

18. The method of claim 17, wherein the step of determining times when each of the three or more satellite server receives the resource request takes into account time zone differences between each of the three or more satellite servers.

19. The method of claim 17, wherein the step of determining times when each of the three or more satellite server receives the resource request takes into account time zone differences between the three or more satellite servers and the network device.

* * * * *